US008275902B2

(12) United States Patent
Philip et al.

(10) Patent No.: US 8,275,902 B2
(45) Date of Patent: Sep. 25, 2012

(54) METHOD AND SYSTEM FOR HEURISTIC THROTTLING FOR DISTRIBUTED FILE SYSTEMS

(75) Inventors: Binu J. Philip, Menlo Park, CA (US); Sudheer Abdul Salam, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 508 days.

(21) Appl. No.: 12/235,106

(22) Filed: Sep. 22, 2008

(65) Prior Publication Data

US 2010/0077096 A1 Mar. 25, 2010

(51) Int. Cl.
*G06F 15/16* (2006.01)
(52) U.S. Cl. ............ 709/233; 710/29; 710/58; 370/232
(58) Field of Classification Search .................. 709/203, 709/217, 219–220, 223–224, 226, 230, 232–235; 710/29, 52, 58, 60; 370/229–234
See application file for complete search history.

(56) References Cited

U.S. PATENT DOCUMENTS

| | | | | | |
|---|---|---|---|---|---|
| 5,623,647 | A | * | 4/1997 | Maitra | 713/501 |
| 5,799,002 | A | * | 8/1998 | Krishnan | 370/234 |
| 5,946,498 | A | * | 8/1999 | Chiang et al. | 710/54 |
| 6,182,176 | B1 | * | 1/2001 | Ziegler et al. | 710/112 |
| 6,400,684 | B1 | * | 6/2002 | Benmohamed et al. | 370/230.1 |
| 6,415,373 | B1 | * | 7/2002 | Peters et al. | 711/167 |
| 6,820,117 | B1 | * | 11/2004 | Johnson | 709/223 |
| 6,928,051 | B2 | * | 8/2005 | Butt et al. | 370/230 |
| 7,089,290 | B2 | * | 8/2006 | Hennessey et al. | 709/213 |
| 2002/0107023 | A1 | * | 8/2002 | Chari et al. | 455/445 |
| 2002/0156910 | A1 | * | 10/2002 | Senda | 709/232 |
| 2003/0226464 | A1 | * | 12/2003 | Mathieson | 101/484 |
| 2004/0010585 | A1 | * | 1/2004 | Jones et al. | 709/224 |
| 2004/0044720 | A1 | * | 3/2004 | Jang et al. | 709/200 |
| 2004/0143663 | A1 | * | 7/2004 | Leedom et al. | 709/226 |
| 2004/0264501 | A1 | * | 12/2004 | Zalitzky et al. | 370/468 |
| 2005/0021830 | A1 | * | 1/2005 | Urzaiz et al. | 709/234 |
| 2005/0114741 | A1 | * | 5/2005 | Chen et al. | 714/47 |
| 2005/0125563 | A1 | * | 6/2005 | Douglas | 709/250 |
| 2006/0160535 | A1 | * | 7/2006 | Snyder et al. | 455/424 |
| 2007/0058669 | A1 | * | 3/2007 | Hoffmann et al. | 370/466 |
| 2008/0244083 | A1 | * | 10/2008 | Guthrie et al. | 709/232 |
| 2009/0245446 | A1 | * | 10/2009 | Hsieh et al. | 375/362 |
| 2010/0017529 | A1 | * | 1/2010 | Takacs et al. | 709/231 |

\* cited by examiner

*Primary Examiner* — Saleh Najjar
*Assistant Examiner* — Eric W Shepperd
(74) *Attorney, Agent, or Firm* — Osha Liang LLP

(57) ABSTRACT

A method for throttling in a file system. The method includes receiving a request by a client from an application to write data to a server, wherein the application is associated with an application bandwidth and wherein the server is associated with a server bandwidth, queuing a first job to write the data to the server on an I/O queue using an application-to-client throttling mechanism using at least one selected from the group of the application bandwidth and the server bandwidth, and issuing the first job from the I/O queue to the server using a client-to-server throttling mechanism and at least one selected from the group of the application bandwidth and the server bandwidth.

20 Claims, 14 Drawing Sheets

METHOD AND SYSTEM FOR HEURISTIC THROTTLING FOR DISTRIBUTED FILE SYSTEMS

BACKGROUND

A typical operating system includes a file system. The file system provides a mechanism for the storage and retrieval of files and a hierarchical directory structure for the naming of multiple files. More specifically, the file system stores information provided by a user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. In a distributed file system, a single file system may span multiple nodes. The nodes may be located on separate physical clients, or on virtual machines.

In a single server multiple client environment, each client may simultaneously send Input/Output (I/O) requests to the server for storage or retrieval of data in the file system maintained by the server. Accordingly, while a single client may send I/O requests at a throughput that is optimal for the individual client, the client has no means for determining the optimal throughput for the server, which is dependent on the throughput of other clients in the system.

SUMMARY

In general, in one aspect, the invention relates to a method for throttling in a file system. The method includes receiving a request by a client from an application to write data to a server, wherein the application is associated with an application bandwidth and wherein the server is associated with a server bandwidth, queuing a first job to write the data to the server on an I/O queue using an application-to-client throttling mechanism using at least one selected from the group of the application bandwidth and the server bandwidth, and issuing the first job from the I/O queue to the server using a client-to-server throttling mechanism and at least one selected from the group of the application bandwidth and the server bandwidth.

In general, in one aspect, the invention relates to a computer readable storage medium for throttling in a file system, comprising computer readable code configured to receive a request by a client from an application to write data to a server, wherein the application is associated with an application bandwidth and wherein the server is associated with a server bandwidth. The computer readable code is further configured to queue a first job to write the data to the server on an I/O queue using an application-to-client throttling mechanism and at least one selected from the group of the application bandwidth and the server bandwidth, and issue the first job using a client-to-server throttling mechanism and at least one selected from the group of the application bandwidth and the server bandwidth.

In general, in one aspect, the invention relates to a client. The client includes a processor and a storage device. The storage device includes instructions executable by the processor, wherein the instructions enable the client to perform a method. The method includes receiving a request by a client from an application to write data to the server, wherein the application is associated with an application bandwidth and wherein the server is associated with a server bandwidth. The method also includes queuing a first job to write the data to the server on an I/O queue using an application-to-client throttling mechanism and at least one selected from a group consisting of the application bandwidth and the server bandwidth. The method also includes issuing the first job from the I/O queue to the server using a client-to-server throttling mechanism and at least one selected from a group consisting of the application bandwidth and the server bandwidth. Other aspects of the invention will be apparent from the following description and the appended claims.

DETAILED DESCRIPTION

Figure 1:
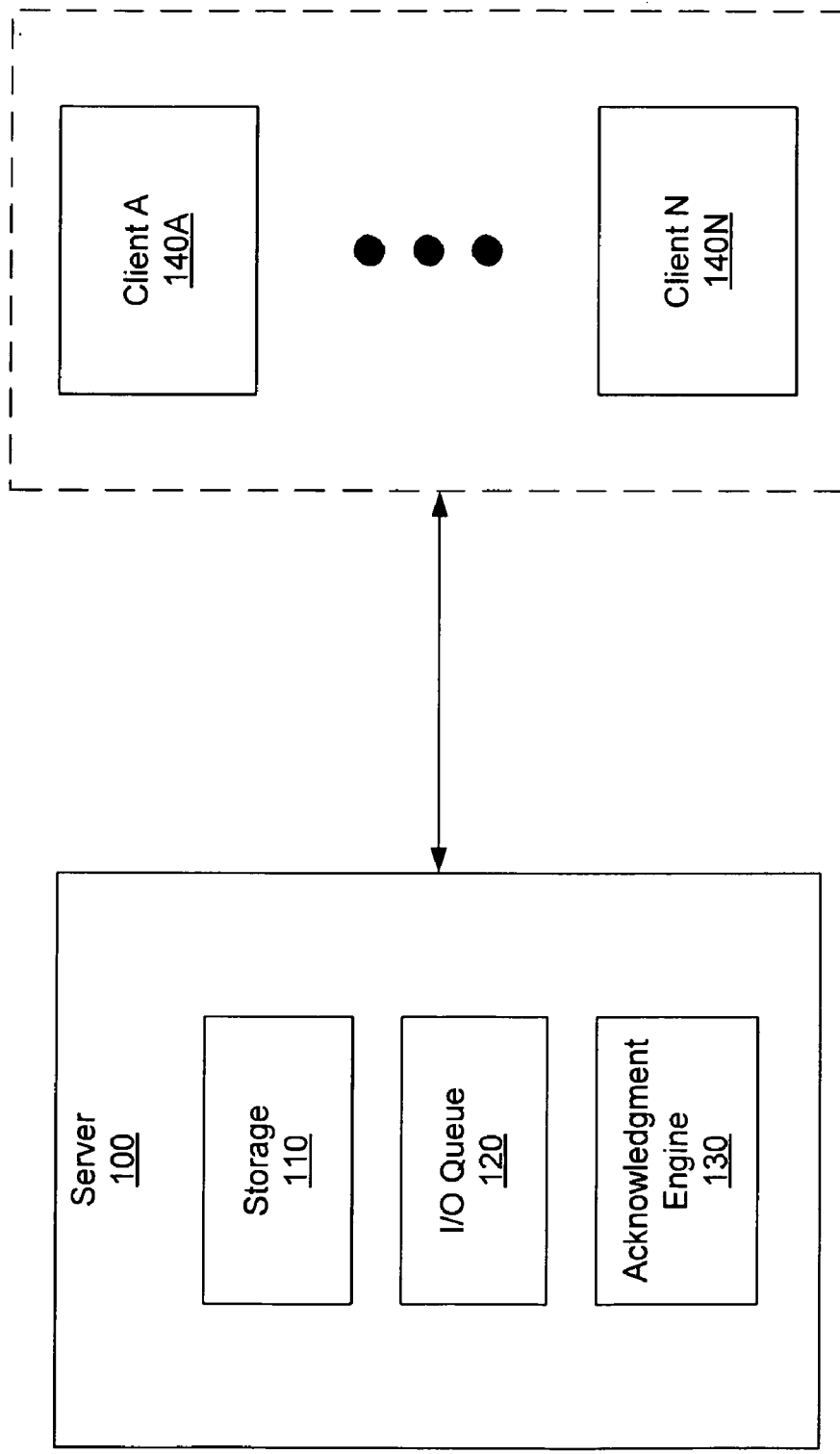
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for heuristic throttling for distributed file systems. Specifically, in one or more embodiments of the invention, a client uses throttling mechanisms to generate and issue I/O requests between a client and a server at a rate that is optimal for both the client and the server. In one or more embodiments of the invention, the throttling mechanisms manage the speed at which data is being generated, and the speed and method at which I/O requests are issued from the client to the server. In general, embodiments of the invention provide a system and method to optimize data transfer between a set of clients and a server in a cluster environment.

FIG. 1 shows a system according to one or more embodiments of the invention. The system includes a server (100) interfacing with one or more clients (140A-140N). According to one or more embodiments of the invention, the server (100) and clients (140A-140N) communicate with each other across a network, for example, a local area network (LAN) or a wide area network (WAN).

Alternatively, in one or more embodiments of the invention, the server and clients may be connected directly. Further, the server (100) includes a storage device (110), an I/O queue (120), and an acknowledgment engine (130).

Figure 2:
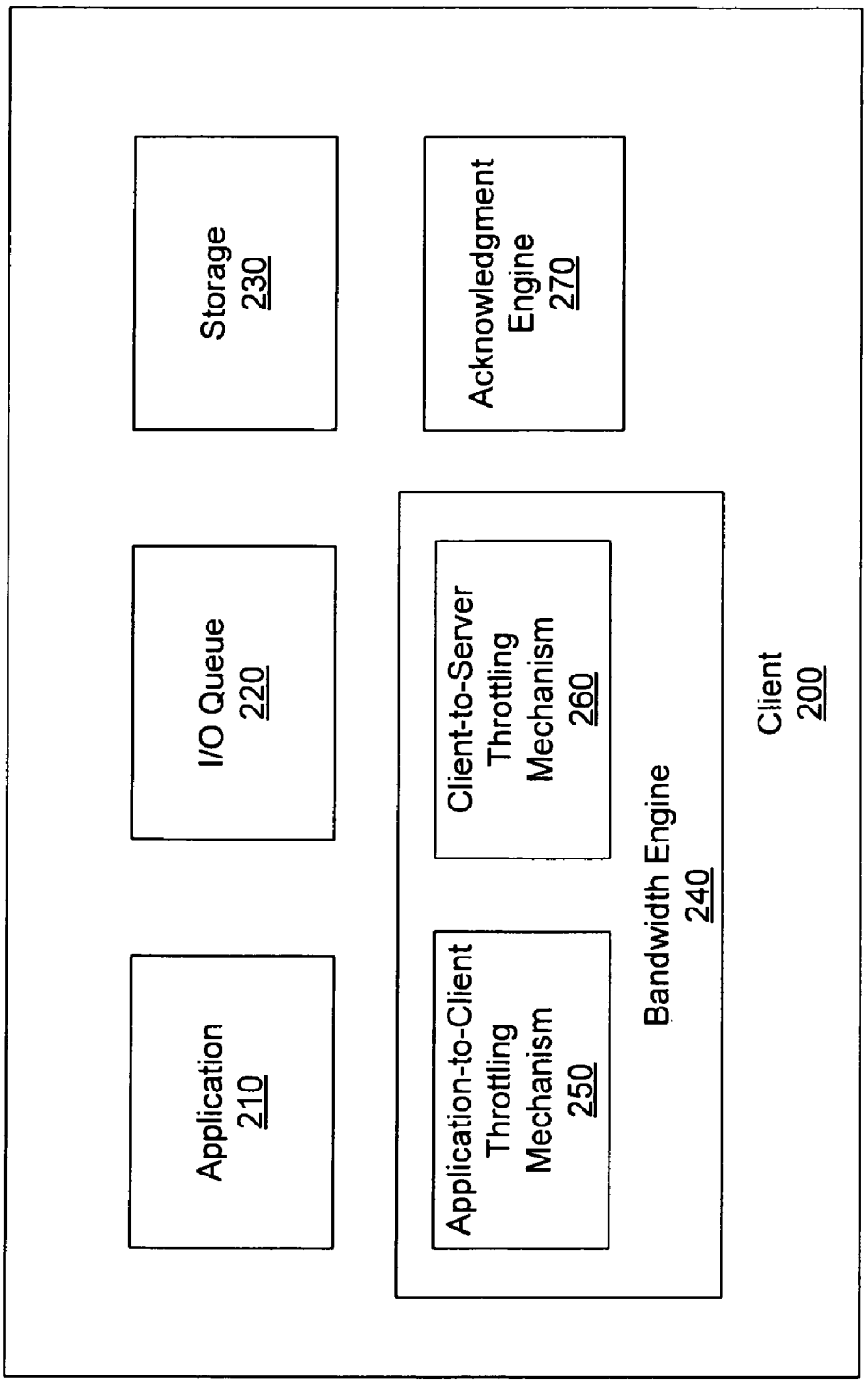
FIG. 2 shows a client in accordance with one or more embodiments of the invention.

In one or more embodiments of the invention, each of the clients (140A-140N) may be located on a separate physical machine. In one or more embodiments of the invention, the clients (140A-140N) may be located on nodes in a cluster. In one embodiment of the invention, a cluster is a series of linked computers working together across a network. One embodiment of a client (140A-140N) is shown in FIG. 2.

In one or more embodiments of the invention, the storage device (110) stores data that is sent to the server (100). The storage device corresponds to any medium capable of storing data, including metadata. Examples of storage devices include, but are not limited to, flash-type storage devices (e.g., NAND-Flash memory, NOR-Flash memory, etc.), hard disks (i.e., non-volatile storage devices which store digitally encoded data on rotating platters with magnetic surfaces), optical disks, hybrid storage devices (i.e., storage devices that include two or more types of storage media, for example, flash-type medium and magnetic media), or a combination thereof.

The server (100) includes at least one I/O queue (120). In one or more embodiments of the invention, the I/O queue (120) temporarily stores I/O requests from at least one client (140A-140N). Alternatively, there may be a single I/O queue for all clients (140A-140N) interfacing with the server.

In one or more embodiments of the invention, the acknowledgment engine generates and sends notifications regarding I/O activity in the server (100). In one or more embodiments of the invention, the acknowledgment engine (130) sends an acknowledgment to a client (140) when an I/O request from that client has been received. The acknowledgment engine (130) may also send an acknowledgment when an I/O request has been completed. In one or more embodiments of the invention, the acknowledgment engine (130) is configured to interface with the I/O queue (120) to identify I/O activity.

FIG. 2 shows a client in accordance with one or more embodiments of the invention. The client (200) includes an application (210), an I/O queue (220), client storage (230), a bandwidth engine (240), and an acknowledgment engine (270). The bandwidth engine (240) includes an application-to-client throttling mechanism (250) and a client-to-server throttling mechanism (260). In one or more embodiments of the invention, the application (210) is configured to generate requests to write data to the server (100).

The I/O queue (220) temporarily stores I/O requests for I/O activity between the client (140) and the server (100). The I/O queue (220) may also temporarily store requests to write data generated by the application (210).

The client storage (230) is a storage device used to store data on the client (200). The client storage (230) is configured to store data requested to be written to the server until it is stored on the server. The storage device corresponds to any medium capable of storing data, including metadata. Examples of storage devices include, but are not limited to, flash-type storage devices (e.g., NAND-Flash memory, NOR-Flash memory, etc.), hard disks (i.e., non-volatile storage devices which store digitally encoded data on rotating platters with magnetic surfaces), optical disks, hybrid storage devices (i.e., storage devices that include two or more types of storage media, for example, flash-type medium and magnetic media), or a combination thereof.

The client (200) also includes a bandwidth engine (240). According to one or more embodiments of the invention, the bandwidth engine (240) includes functionality to determine a bandwidth between the client (140) and the server (100). Further, the bandwidth engine includes functionality to manage the rate at which data is moved between various components of the system. Specifically, the bandwidth engine (240) may include functionality to manage an application bandwidth. The application bandwidth corresponds to the rate at which data is generated by the application (210) and stored in the client storage (230). According to one or more embodiments of the invention, the bandwidth engine (240) may also include functionality to manage a server bandwidth. The server bandwidth corresponds to the rate at which I/O requests to write data to the server are issued from the I/O queue (220).

The application-to-client throttling mechanism (250) includes functionality to manage the application bandwidth. According to one or more embodiments of the invention, the application-to-client throttling mechanism (250) manages the application bandwidth by monitoring the rate of data to be written to client storage (230) and the availability of the client storage (230) to obtain an optimal application bandwidth. The application bandwidth may be dynamically modified depending on the determined bandwidth between the client (140) and server (100) (See FIG. 6).

The client-to-server throttling mechanism (260) includes functionality to manage the server bandwidth. According to one or more embodiments of the invention, the client-to-server throttling mechanism (260) manages the server bandwidth by monitoring the rate of data written to the server (100). In one or more embodiments of the invention, the client-to-server throttling mechanism uses acknowledgments sent from the server to determine the server bandwidth. The server bandwidth may be dynamically modified depending on the determined bandwidth between the client (140) and the server (100).

In one or more embodiments of the invention, the bandwidth engine (240) is configured to calculate the bandwidth between the client and the server over a fixed time quanta. For example, the bandwidth engine (240) may determine the bandwidth between the client and the server depending on the amount of data per second generated by the application and the amount of data per second written to the server. The bandwidth engine (240) also includes functionality to reset the application bandwidth or the server bandwidth as described in FIG. 6. Periodically resetting the application bandwidth and the server bandwidth and adjusting the bandwidths between resets allows for optimal data flow between the client (140) and the server (100).

The acknowledgment engine (270) is configured to receive acknowledgments from a server. According to one or more embodiments of the invention, the acknowledgment engine receives acknowledgments when the server acknowledges a job, such as an I/O request to write data, from the client. The acknowledgment engine also receives an acknowledgment from the server when the job, such as the I/O request to write data, has been completed. According to one or more embodiments of the invention, the acknowledgment engine may be part of the bandwidth engine.

Figure 3:
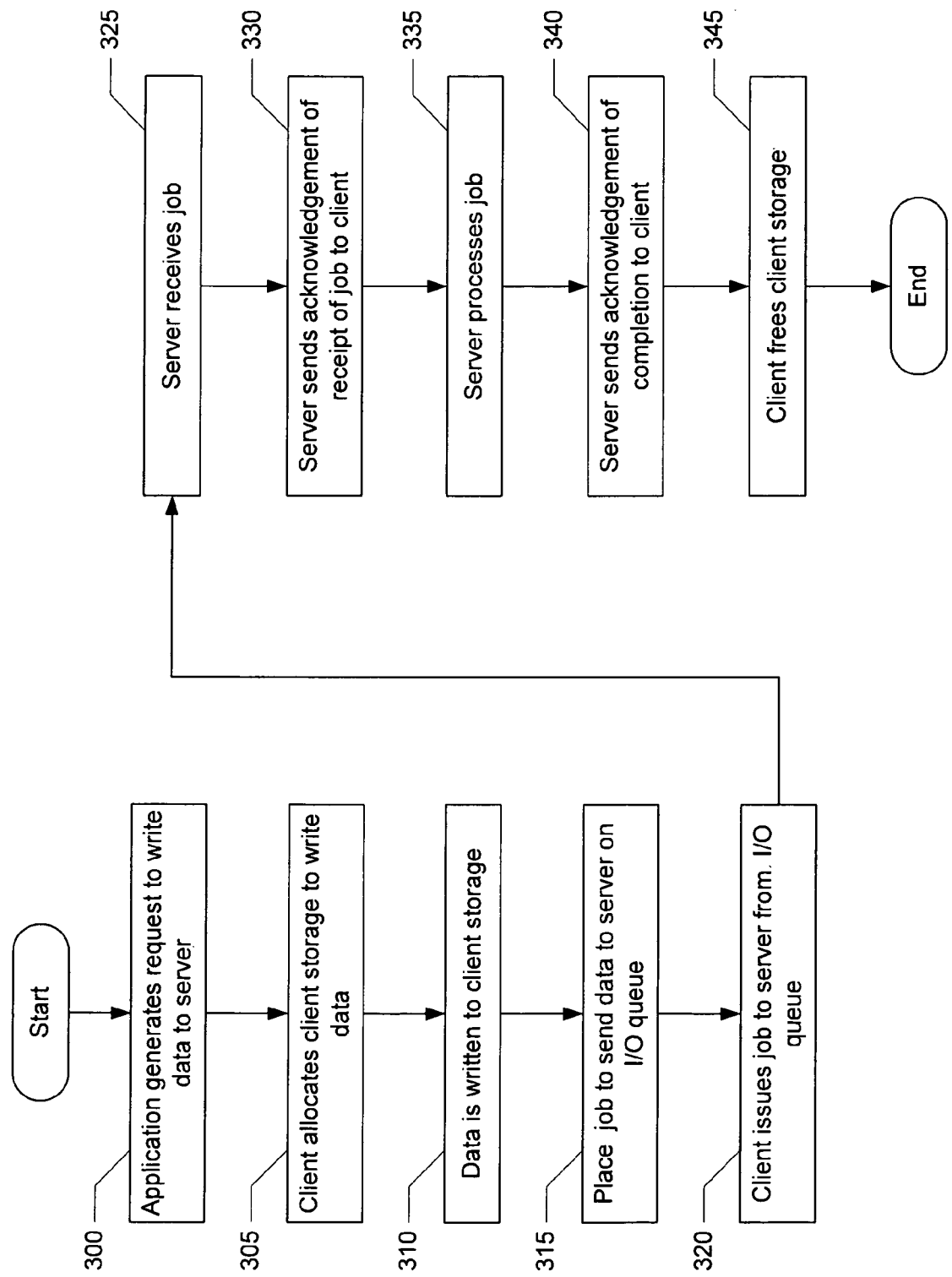
FIGS. 3-6 show flow charts in accordance with one or more embodiments of the invention.

FIG. 3 shows a method for writing data generated by an application in a client to a server. Those skilled in the art will appreciate that the following steps all occur within a client in a system and that multiple clients in the system could each perform the following method. While the various steps in this flowchart are presented and described sequentially, one of ordinary skill will appreciate that some or all of the steps may be executed in different orders, may be combined or omitted, and some or all of the steps may be executed in parallel.

At 300, the application generates a request to write data to the server. According to one or more embodiments of the invention, the application is located in the client. At 305, the client allocates client storage to write the data. According to one or more embodiments of the invention, the client stores the data to be written to the server locally before it is written to the server. At 310, the application writes the data to the allocated client storage.

At 315, a job is placed on the I/O queue. According to one or more embodiments of the invention, the job is to write data from the client to the server. At 320, the client issues the job to the server. At 325, the server receives the job. At 330, the server, upon receipt of the job, sends an acknowledgment of the receipt of the job. According to one or more embodiments of the invention, the acknowledgment engine in the server generates the acknowledgment to send to the server. At 335, the server processes the job.

When the server has completed processing the job, at 340, the server sends an acknowledgment of completion to the client. According to one or more embodiments of the invention, the acknowledgment is generated by an acknowledgment engine in the server. At 345, the client identifies that the job to write data to the server has been completed and frees the allocated client memory where the data was stored locally.

Figure 4:
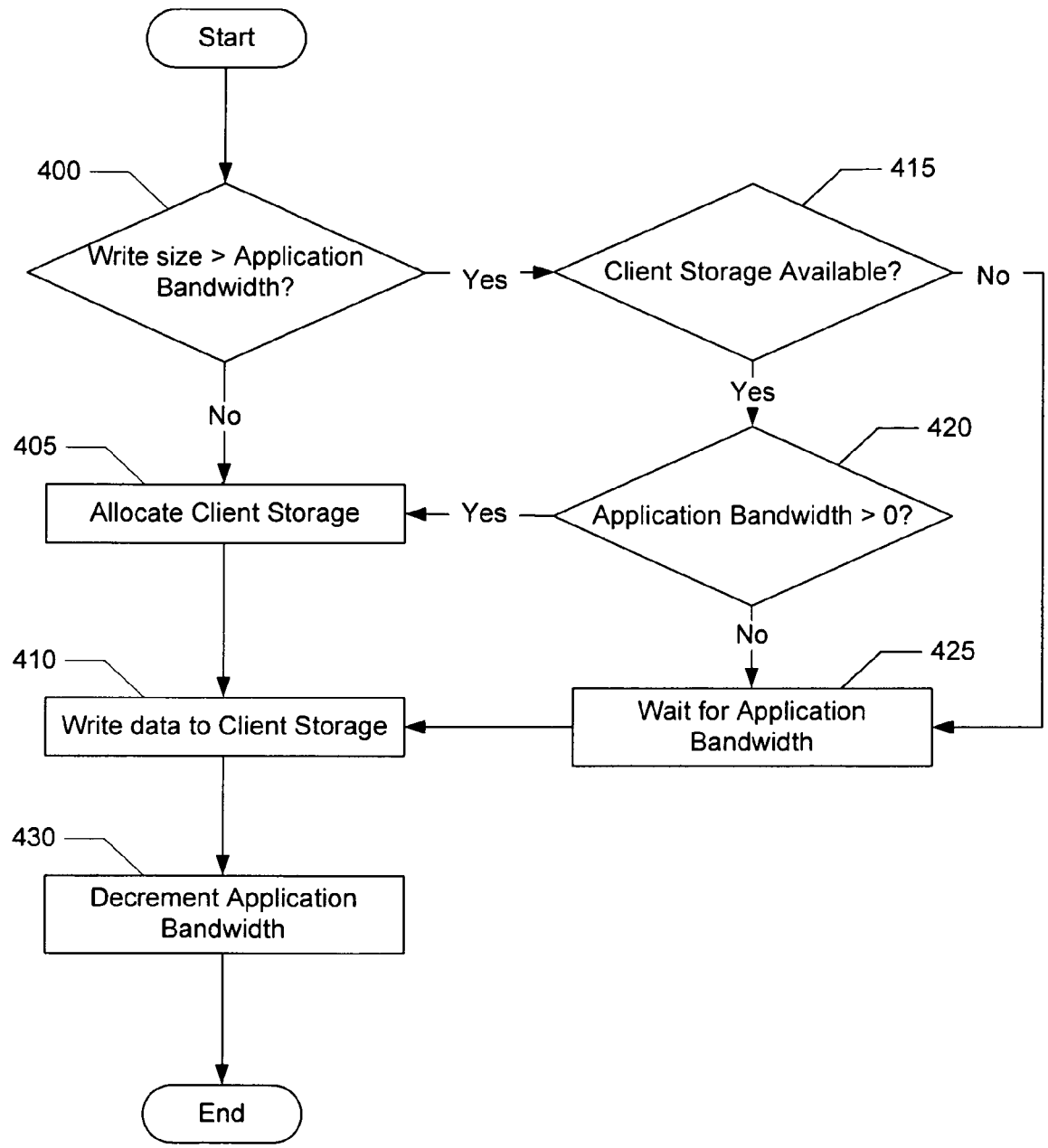

FIG. 4 shows a method for throttling an application bandwidth within the process of writing data from an application to the server. According to one or more embodiments of the invention, the application bandwidth is the rate of data generated by an application and stored in client storage, as shown in 300-310 of FIG. 3. These steps may be performed, at least in part, by the application-to-client throttling mechanism. Those skilled in the art will appreciate that the following steps all occur within a client in a system and that multiple clients in the system could each perform the following method. While the various steps in this flowchart are presented and described sequentially, one of ordinary skill will appreciate that some or all of the steps may be executed in different orders, may be combined or omitted, and some or all of the steps may be executed in parallel.

At 400, the application-to-client throttling mechanism determines whether the size of the data to write to the server is greater than the application bandwidth.

According to one or more embodiments of the invention, the application bandwidth corresponds to the amount of data that may be processed between the application and client storage. If the size of the data is not greater than the application bandwidth then, at 405, the application-to-client throttling mechanism allocates client storage to store the data in the client. At 410, the data is written to the allocated client storage. At 430, the application bandwidth is decremented.

According to one or more embodiments of the invention, the application bandwidth is decremented to reach an optimized application bandwidth level.

Returning to 400, if the size of the data is greater than the application bandwidth then, at 415, the application-to-client throttling mechanism determines whether client storage is available. If there is client storage available then, at 420, the application-to-client throttling mechanism determines if the application bandwidth is greater than zero. If there is any application bandwidth available then, at 405, the application-to-client throttling mechanism allocates client storage to store the data in the client. At 410, the data is written to the allocated client storage. At 430, the application bandwidth is decremented. According to one or more embodiments of the invention, the application bandwidth is decremented to reach an optimized application bandwidth level.

Figure 6:
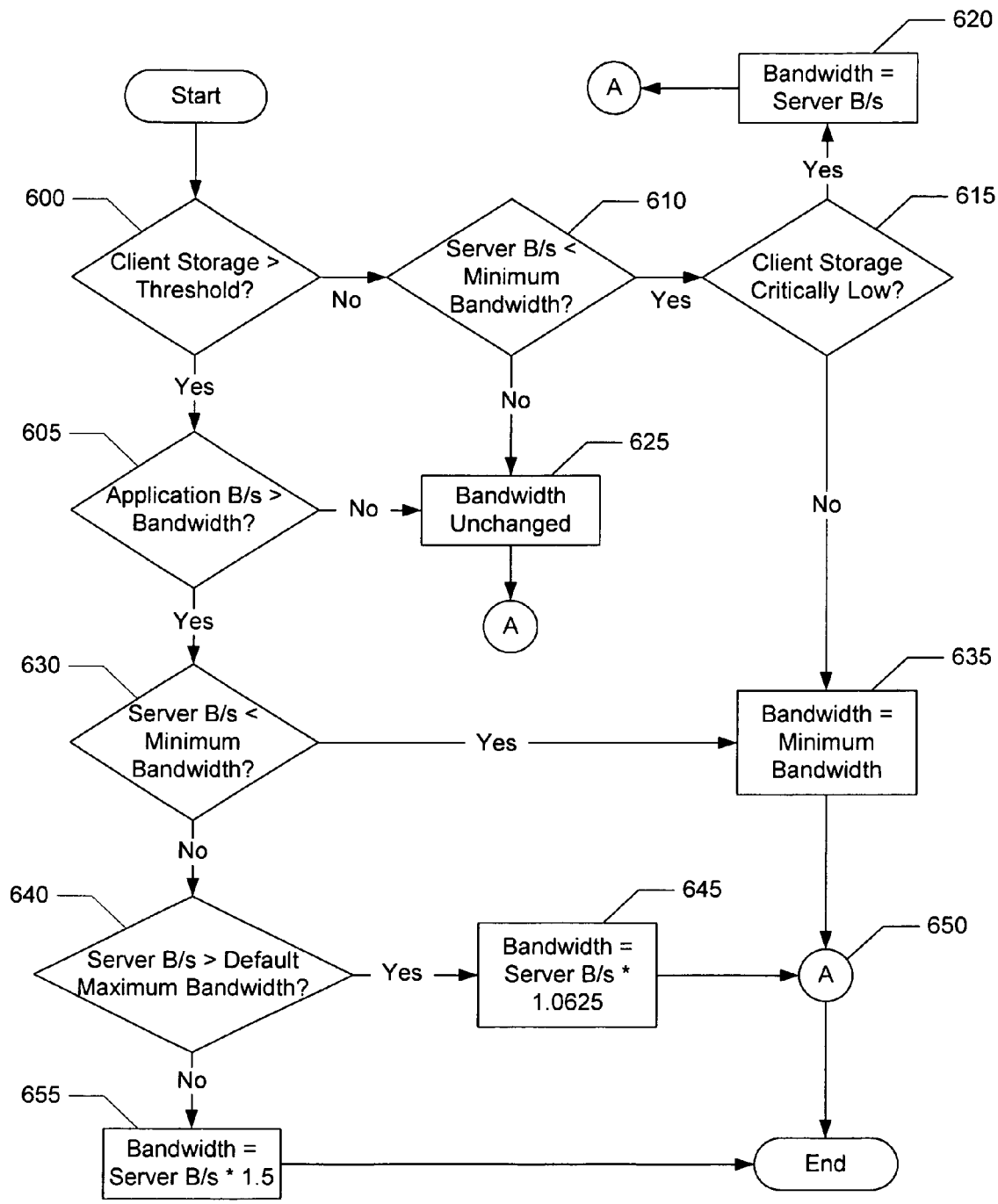

If at 400, the write size is greater than the application bandwidth, and at 415 client storage is not available, then at 425, the application-to-client throttling mechanism waits for application bandwidth to become available. According to one or more embodiments of the invention, application bandwidth may become available depending on other activity within the client, such as data generated by the application or jobs completed by the server. According to one or more embodiments of the invention, these are just some factors that may affect application bandwidth. For example, according to one or more embodiments of the invention, the application bandwidth and server bandwidth may be dynamically reset, as shown in FIG. 6. At 410, when application bandwidth becomes available, then the data is written to client storage and at 430 the application bandwidth is decremented.

Figure 5:
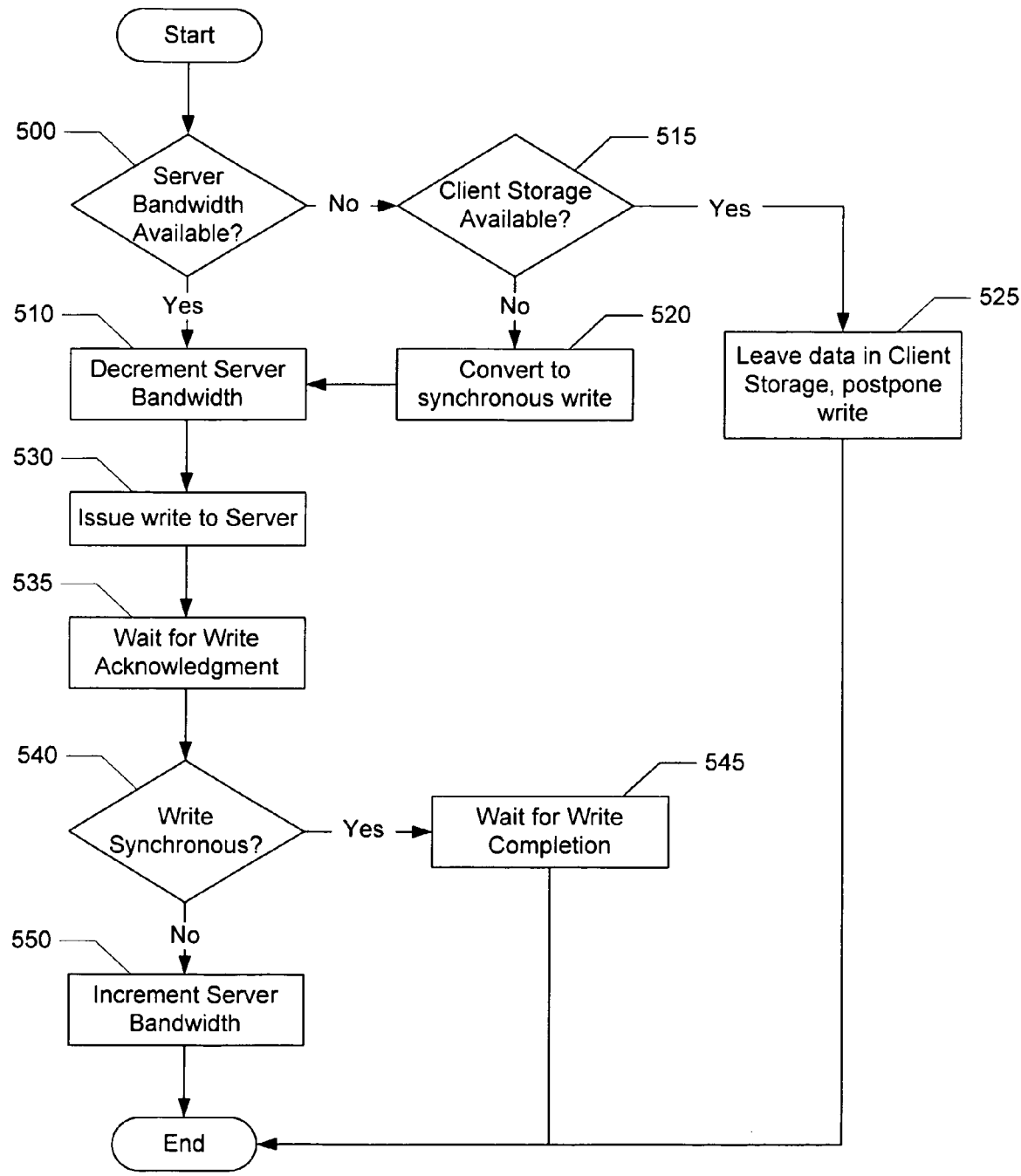

FIG. 5 shows a method for throttling a server bandwidth within the process of writing data from an application to the server. According to one or more embodiments of the invention, the server bandwidth is the rate at which data is issued to be written to the server, as shown in 315-320 of FIG. 3. Those skilled in the art will appreciate that the following steps all occur within a client in a system and that multiple clients in the system could each perform the following method. According to one or more embodiments of the invention, these steps are performed, at least in part, by the client-to-server throttling mechanism. While the various steps in this flowchart are presented and described sequentially, one of ordinary skill will appreciate that some or all of the steps may be executed in different orders, may be combined or omitted, and some or all of the steps may be executed in parallel.

At 500, the client-to-server throttling mechanism determines whether server bandwidth is available. At 510, if server bandwidth is available, then the client-to-server throttling mechanism decrements the server bandwidth. According to one or more embodiments of the invention, the client-to-server throttling mechanism decrements the server bandwidth as part of a process of optimizing the server bandwidth.

At 530, the client issues the job to write data to the server. At 535, the process is suspended while the client-to-server throttling mechanism waits for a write acknowledgment from the server. According to one or more embodiments of the invention, the write acknowledgment is an acknowledgment generated and sent to the client when the server has received a job from the client. When the write acknowledgment is received, then at 540, the bandwidth engine determines whether the write is synchronous. According to one or more embodiments of the invention, the write will default as an asynchronous write unless action is taken to convert the write to a synchronous write. In this case, the write has remained asynchronous. At 550, the client-to-server throttling mechanism increments the server bandwidth.

Returning to 500, if server bandwidth is not available then, at 515, a determination is made whether client storage is available. If client storage is available then, at 525, the data, which is currently stored in client storage, remains stored there and the write is postponed. According to one or more embodiments of the invention, if client storage is full and there is no room for more data to be stored by subsequent jobs, then action must be taken to clear memory. At 520, when client storage is not available and server bandwidth is not available, then the write is converted to a synchronous write. The process continues at 510, where the client-to-server throttling mechanism decrements the server bandwidth. At 530, the client issues the job to write data to the server. At 535 the process is suspended while the client-to-server throttling mechanism waits for a write acknowledgment from the server.

When the write acknowledgment is received, then at 540, a determination is made whether the write is synchronous. In this case, the write has been converted to a synchronous write. At 545, the client-to-server throttling mechanism is suspended until receiving a write completion acknowledgment. According to one or more embodiments of the invention, the write completion acknowledgment is generated and by the server when the job to write data to the server has been completed. In the case of a synchronous write, this ends the process of throttling the server bandwidth.

There is a perceived bandwidth for data sent from the client to the server. According to one or more embodiments of the invention, the application bandwidth and the server bandwidth are continuously being modified to try to reach an optimal state. According to one or more embodiments of the invention, periodically the application bandwidth and the server bandwidth will be reset to the perceived bandwidth to facilitate optimization. This perceived bandwidth may be determined by the bandwidth engine in the client.

FIG. 6 shows a method for determining a perceived bandwidth between the client and the server. According to one or more embodiments of the invention, these steps are performed, at least in part, by the bandwidth engine. While the various steps in this flowchart are presented and described sequentially, one of ordinary skill will appreciate that some or all of the steps may be executed in different orders, may be combined or omitted, and some or all of the steps may be executed in parallel.

At 600, the bandwidth engine determines whether available client storage is greater than a threshold of client storage. While this threshold level may vary, it is a level associated with determining whether there is more than merely a sufficient amount of client storage for data to be stored. When the amount of available client storage is greater than the threshold, then at 605, a decision is made about whether the amount of data generated by the application (e.g., in Bytes per second) is greater than the current bandwidth. The current bandwidth is associated with the perceived bandwidth between the client and server as it has previously been determined by the bandwidth engine using prior data. When this is not the case, then at 625, the bandwidth remains unchanged and the process for determining the bandwidth ends at 650.

Returning to 605, in the case where the number of bytes per second of data generated by the application is not greater than the current bandwidth, then at 630, a determination is made about whether the number of bytes per second acknowledged by the server is less than a minimum bandwidth. According to one or more embodiments of the invention, the bandwidth engine may include a default minimum bandwidth that is associated with the lowest rate of data (e.g., in Bytes per second) allowed between the client and the server. In the case that the amount of data acknowledged by the server in bytes per second is less than the minimum bandwidth, then the bandwidth is set to the default minimum bandwidth at 635.

Returning to 630, if the amount of data acknowledged by the server in bytes per second is not less than the minimum bandwidth, then at 640, a determination is made about whether the data written to the server in bytes per second is greater than the default maximum bandwidth. According to one or more embodiments of the invention, the bandwidth engine may include a default maximum bandwidth, which is the largest rate of data (e.g., in Bytes per second) that should be allowed between the client and the server. At 655, in the case that the amount of data acknowledged by the server in bytes per second is not greater than the default bandwidth, then the bandwidth is calculated to be the amount of data acknowledged by the server in bytes per second multiplied by a scalar (e.g., 1.5). At 645, in the case where the amount of data acknowledged by the server in bytes per second is not greater than the default maximum bandwidth, then the bandwidth is determined by multiplying the amount of data acknowledged by the server in bytes per second by another smaller scalar value (e.g., 1.0625).

Returning to 600, if the amount of client storage is not greater than a default threshold amount of client storage, then at 610 a determination is made about whether the amount of data acknowledged by the server in bytes per second is less than the default minimum bandwidth. When this is not the case, at 625, the bandwidth remains unchanged. However, when the amount of data acknowledged by the server in bytes per second is less than the minimum bandwidth, then at 615 a determination is made whether the amount of client storage is critically low. According to one or more embodiments of the invention, the bandwidth engine may include a value for the amount of available storage at which it is considered critically low. When the amount of client storage available is critically low, then at 620, the bandwidth is set to the amount of data acknowledged by the server in bytes per second. If the amount of available client storage is not critically low, then the bandwidth is set to the default minimum bandwidth at 635.

According to one or more embodiments of the invention, the application bandwidth and the server bandwidth may be dynamically modified. According to one or more embodiments of the invention, the application bandwidth and the server bandwidth are dynamically modified to be set to the perceived bandwidth between the client and the server as calculated in FIG. 6 and described above. As shown in FIG. 6, the calculation for the perceived bandwidth may change over time depending on data transfer activity within the client. This includes the application bandwidth, which is the rate of data generated by the application and stored in the client storage within a client, and the rate of data acknowledgment, which is the rate of data written to the server from the client. According to one or more embodiments of the invention, the rate of data acknowledgment may be determined using the acknowledgment engine in the client.

In one embodiment of the invention, the method shown in FIG. 6 is performed periodically (e.g., every second, every minute, every 5 minutes, etc.). Further, the method shown in FIG. 6 may be performed concurrently with methods shown in FIGS. 3-5. Further, multiple clients within the system may each perform methods shown in FIGS. 3-6 in parallel with other clients.

The following describes various examples implementing one or more embodiments of the invention. The examples are not intended to limit the scope of the invention.

EXAMPLE 1

Consider a scenario in which there is more than sufficient client storage available, the default minimum bandwidth is 2 megabytes (MB) per second (s), the default maximum bandwidth is 20 MB/s, and that the current perceived bandwidth between the client and server is 40 MB/s. In one or more embodiments of the invention, the perceived bandwidth may have been calculated at a previous time using previous data. In one or more embodiments of the invention, the perceived bandwidth may have been calculated using the method shown in FIG. 6. Further, assume that an application on a client has written 60 MB of data to the client storage in the last second and the server has acknowledged 55 MB of data in the last second.

In this scenario, a determination is made that the application bandwidth in the last second (60 MB/s) is greater than the current perceived bandwidth (40 MB/s). The server rate of data transfer in the last second (55 MB/s) is not less than the default minimum bandwidth (2 MB/s). A determination is made that the rate of acknowledgment (55 MB/s) is greater than the default maximum bandwidth (20 MB/s). Accordingly, the current perceived bandwidth is calculated as 55 MB/s*1.0625=58.4 MB/s.

Alternatively, consider that there is not more than sufficient client storage available. In this scenario, a determination is made that the rate of acknowledgment in the last second (55 MB/s) is not less than the default minimum bandwidth (2 MB/s). Accordingly, the current perceived bandwidth between the client and the server in this case would remain unchanged, at 40 MB/s.

According to one or more embodiments of the invention, the application bandwidth (the rate of data generated by the application and stored on the client storage), and the server bandwidth (the rate of data issued to the server as write requests) may be dynamically modified based on the current perceived bandwidth. Upon calculating the current perceived bandwidth as described above in Example 1, the bandwidth engine may reset the application bandwidth and the server bandwidth to the current perceived bandwidth.

EXAMPLE 2

In another example, consider a scenario in which there is more than sufficient client storage available, the default minimum bandwidth is 2 MB/s, the default maximum bandwidth is 20 MB/s, and that the previously calculated current perceived bandwidth between the client and server is 8 MB/s. In one or more embodiments of the invention, the current perceived bandwidth is previously calculated using the method shown in FIG. 6. Further, assume that an application has generated 10 MB of data to the client storage in the last second and the server has acknowledged 14 MB of data in the last second.

In this scenario, a determination is made that the rate of data generated by the application in the last second (10 MB/s) is greater than the current perceived bandwidth (8 MB/s). The rate of data acknowledgment by the server in the last second (14 MB/s) is not less than the default minimum bandwidth (2 MB/s). A determination is made that the rate of data acknowledgment by the server in the last second (14 MB/s) is not greater than the default maximum bandwidth (20 MB/s). Accordingly, the current perceived bandwidth is calculated as 14 MB/s*1.5=21 MB/s.

Alternatively, consider that there is not more than sufficient client storage available. In this scenario, a determination is made that the rate of data acknowledgment in the last second (14 MB/s) is not less than the default minimum bandwidth (2 MB/s). Accordingly, the current perceived bandwidth in this case would remain unchanged, at 8 MB/s.

Upon calculating the current perceived bandwidth as described above in Example 2, the bandwidth engine may reset the application bandwidth and the server bandwidth to the current perceived bandwidth.

EXAMPLE 3

In one more example, consider the case where there is more than sufficient client storage available, the default minimum bandwidth is 2 MB/s, the default maximum bandwidth is 20 MB/s, and the previously calculated current perceived bandwidth between the client and server is 8 MB/s. Further, assume that an application on a client has written 50 bytes of data to the client storage in the last second and the server has acknowledged 0 MB of data in the last second.

In this scenario, a determination is made that the rate of data generated by the application in the last second (50 bytes/s) is not greater than the current perceived bandwidth (8 MB/s). The current perceived bandwidth would remain unchanged, at 8 MB/s.

Alternatively, consider a scenario in which there is not more than sufficient client storage available. In this scenario, a determination is made that the rate of data acknowledgment by the server in the last second (0 MB/s) is less than the default minimum bandwidth (2 MB/s). A determination is made whether available client storage is critically low. In this example, it is most likely that client storage will be critically low because the application is writing data to the client storage, but the server is not acknowledging any data. If the available client storage is critically low, the current perceived bandwidth in this case would be set to the rate of data acknowledgment by the server last second (0 MB/s). However, if the amount of available client storage is not yet critically low, then the current perceived bandwidth would be set to the default minimum bandwidth (2 MB/s).

Upon calculating the current perceived bandwidth as described above in Example 3, the bandwidth engine may reset the application bandwidth and the server bandwidth to the current perceived bandwidth.

FIGS. 7A-7D show a diagram of a client and how the application-to-client throttling mechanism and the client-to-server throttling mechanism impact the rate of data flow in the client over time.

Figure 7A:
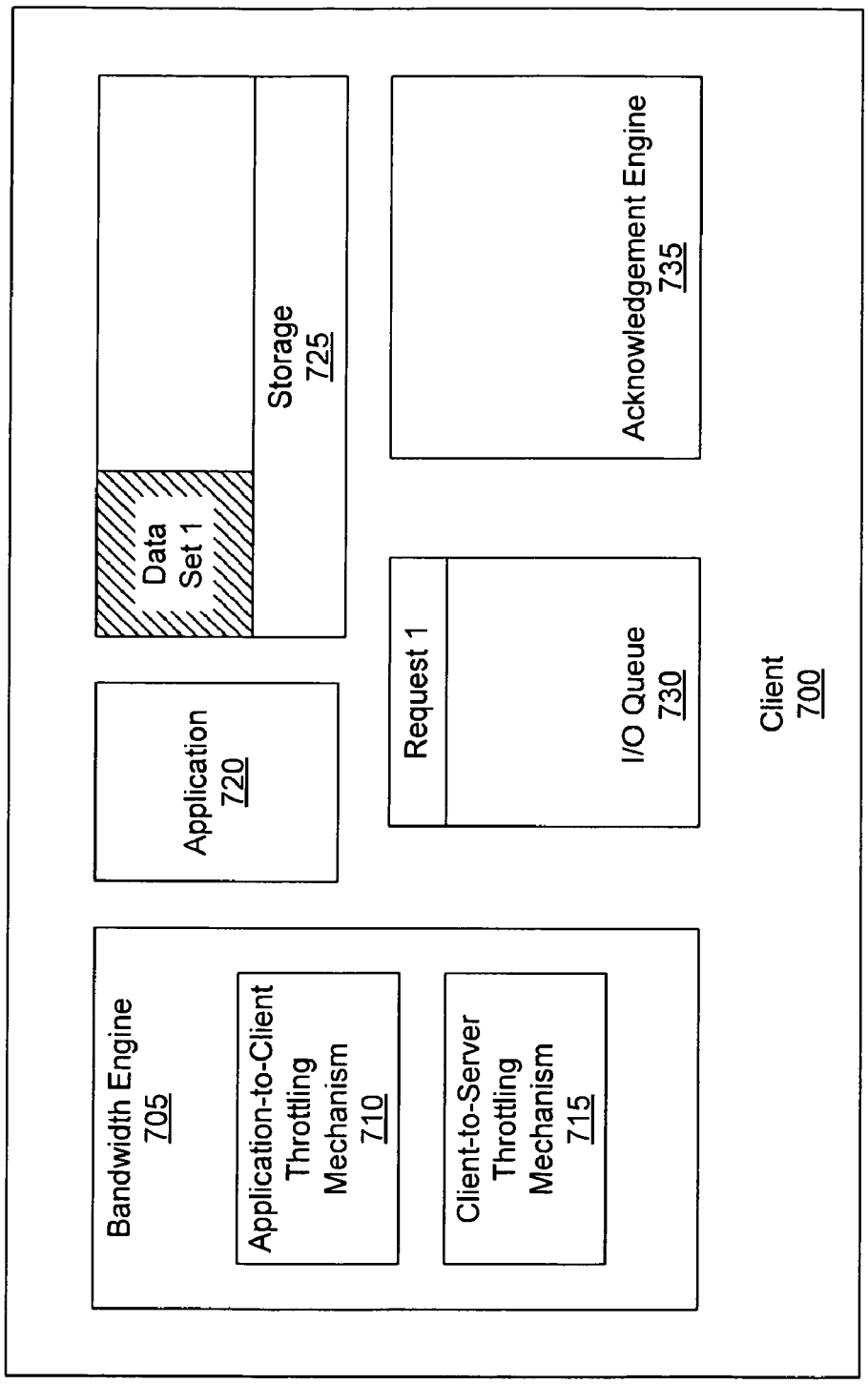
FIGS. 7A-7D show an example in accordance with one or more embodiments of the invention.

FIG. 7A shows a snapshot of a client at a first time. According to one or more embodiments of the invention, the client (700) includes a bandwidth engine (705), and application (720), a storage device (725), and an I/O queue (730), all as described above. In FIGS. 7A-7D, the client (700) also includes an acknowledgment engine (735) used to receive acknowledgments from the server. According to one or more embodiments of the invention, the acknowledgment engine may be part of the bandwidth engine, but is shows separately here for clarification.

Referring to FIG. 7A, Data Set 1 has been generated by the application (720) and stored in client storage (725). A first I/O request to write Data Set 1 to a server has been generated and is placed on the I/O queue (730).

Figure 7B:
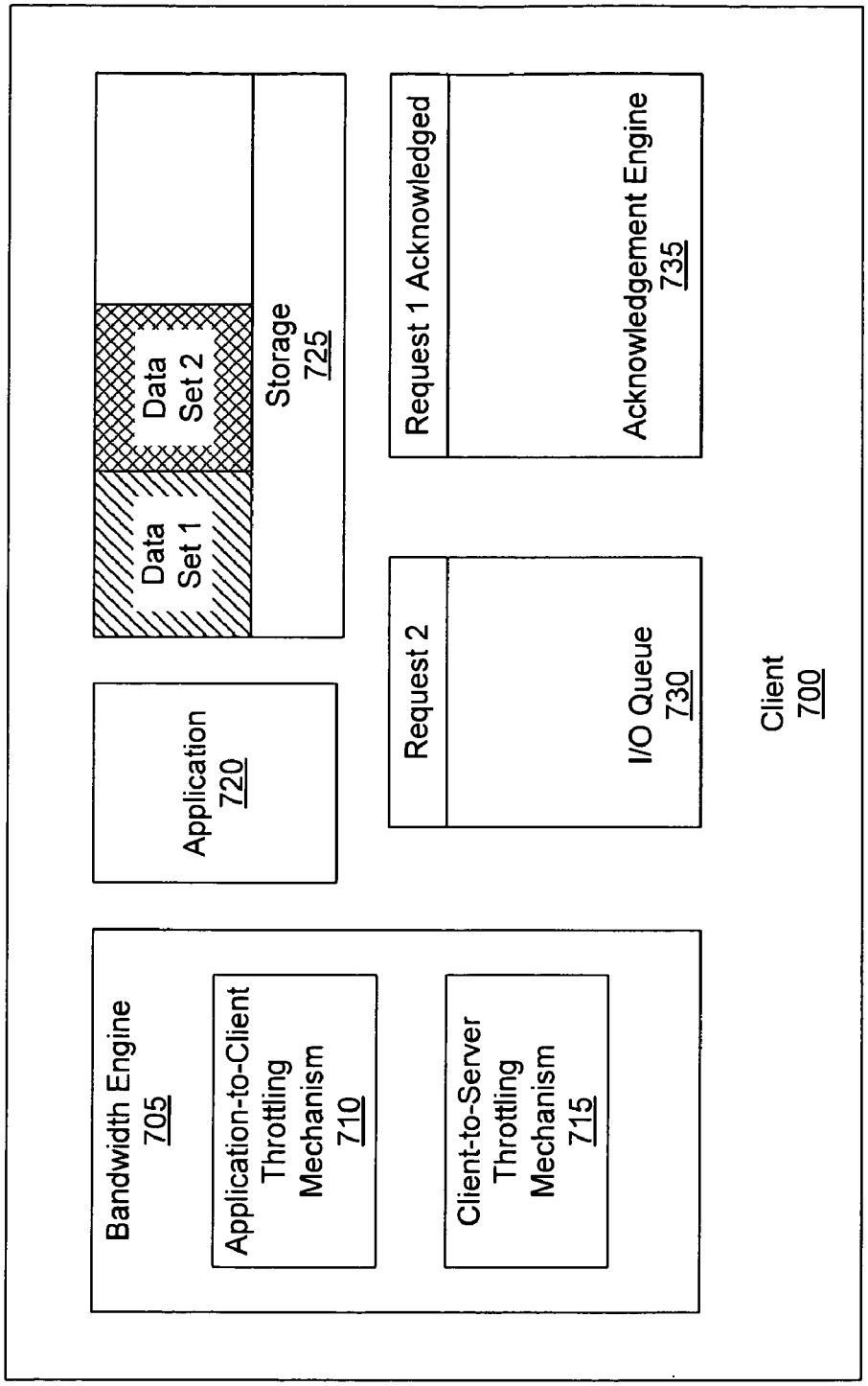

FIG. 7B shows a snapshot of client (700) at a second time. As shown, the application (720) has generated Data Set 2. Now, both Data Set 1 and Data Set 2 are stored in client storage (725). Further, a request to write Data Set 2 has been placed on the I/O Queue (730), and the request to write Data Set 1 has already been issued to the server. The acknowledgment engine (735) shows that the server has acknowledged the request to write Data Set 1. However, the acknowledgment engine has not received an acknowledgment from the server that Data Set 1 has been written and the job is completed. Accordingly, Data Set 1 is still stored in client memory.

Figure 7C:
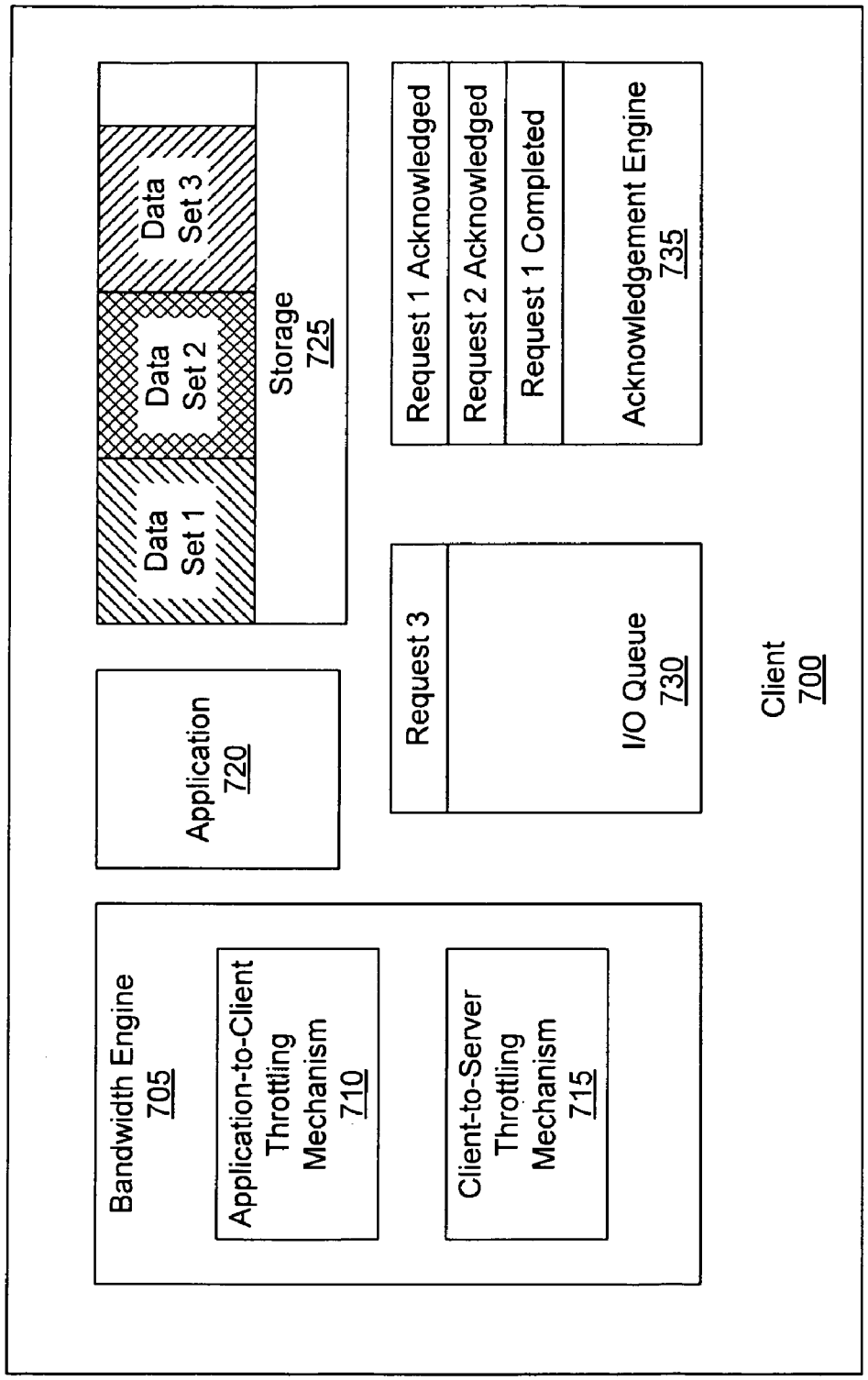

FIG. 7C shows a snapshot of the client (700) at a third time. As shown, the application (720) has generated a request to write Data Set 3 to the server. Now, the client storage includes Data Set 1, Data Set 2, and Data Set 3. The I/O queue (730) now includes a request to write Data Set 3 to the server. The acknowledgment engine (735) shows that the request to write Data Set 1 has been acknowledged and completed. The acknowledgment engine (735) shows that the request to write Data Set 2 has been acknowledged, but not completed. Accordingly, Data Set 1 may be removed from client storage, but Data Set 2 and Data Set 3 remain on client storage.

Between FIGS. 7B and 7C in this example, the bandwidth engine (705) determined that the application (720) was generating data at a rate faster than the rate the server was acknowledging the data. According to one or more embodiments of the invention, this happens because the server is receiving requests to write data from different clients (e.g., in a cluster) and the server is not able to process them quickly enough to keep up with the amount of data generated by each application (700). Accordingly, in FIG. 7C, the application bandwidth may need to be decreased (generate data at a slower rate), or the server bandwidth may need to be increased (increase the rate of requests issued to the server).

Figure 7D:
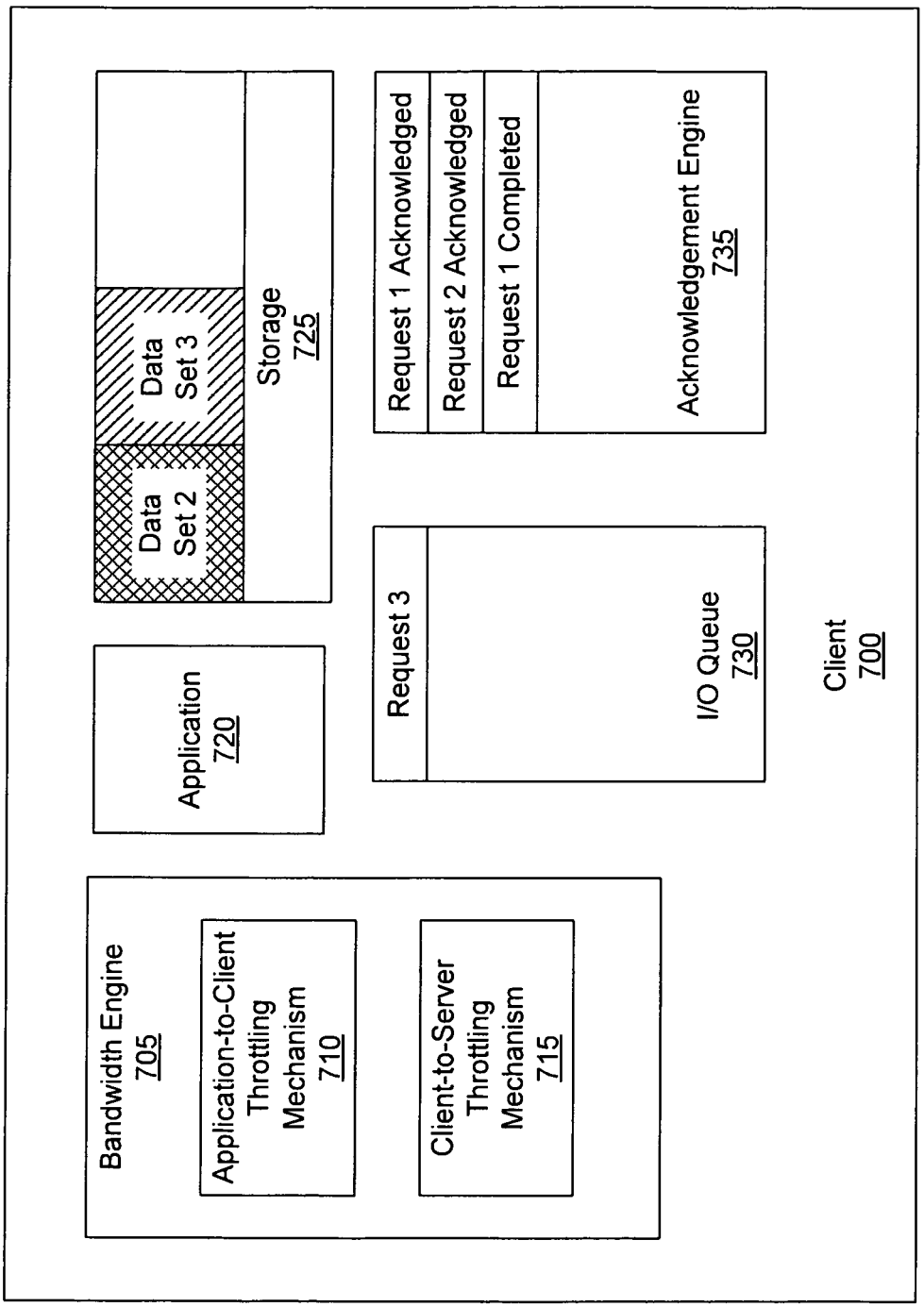

FIG. 7D shows a snapshot of the client (700) at a fourth time. As shown, the application (720) has not generated any more data sets to write to the client. Data Set 2 and Data Set 3 remain stored in client storage. The I/O queue (730) has only one request remaining. The acknowledgment engine (735) shows that the request to write Data Set 1 has been acknowledged and completed. The request to write Data Set 2 has been acknowledged but not completed.

Between FIGS. 7C and 7D, the application-to-client throttling mechanism (710) has decreased the application bandwidth, resulting in the application (720) generating data to write to the server at a slower rate. The application bandwidth is modified as shown in FIG. 4. The client-to-server throttling mechanism (715) has increased the server bandwidth, increasing the rate at which requests to write data are issued to the server from the I/O queue (730). The server bandwidth is modified as shown in FIG. 5. This has resulted in more available client memory in the client storage (725), causing the client (700) to function more efficiently. According to one or more embodiments of the invention, the bandwidth engine will also determine a perceived bandwidth between the client and the server (as described in FIG. 6) and will dynamically reset the application bandwidth and the server bandwidth to the perceived bandwidth as necessary.

Figure 8A:
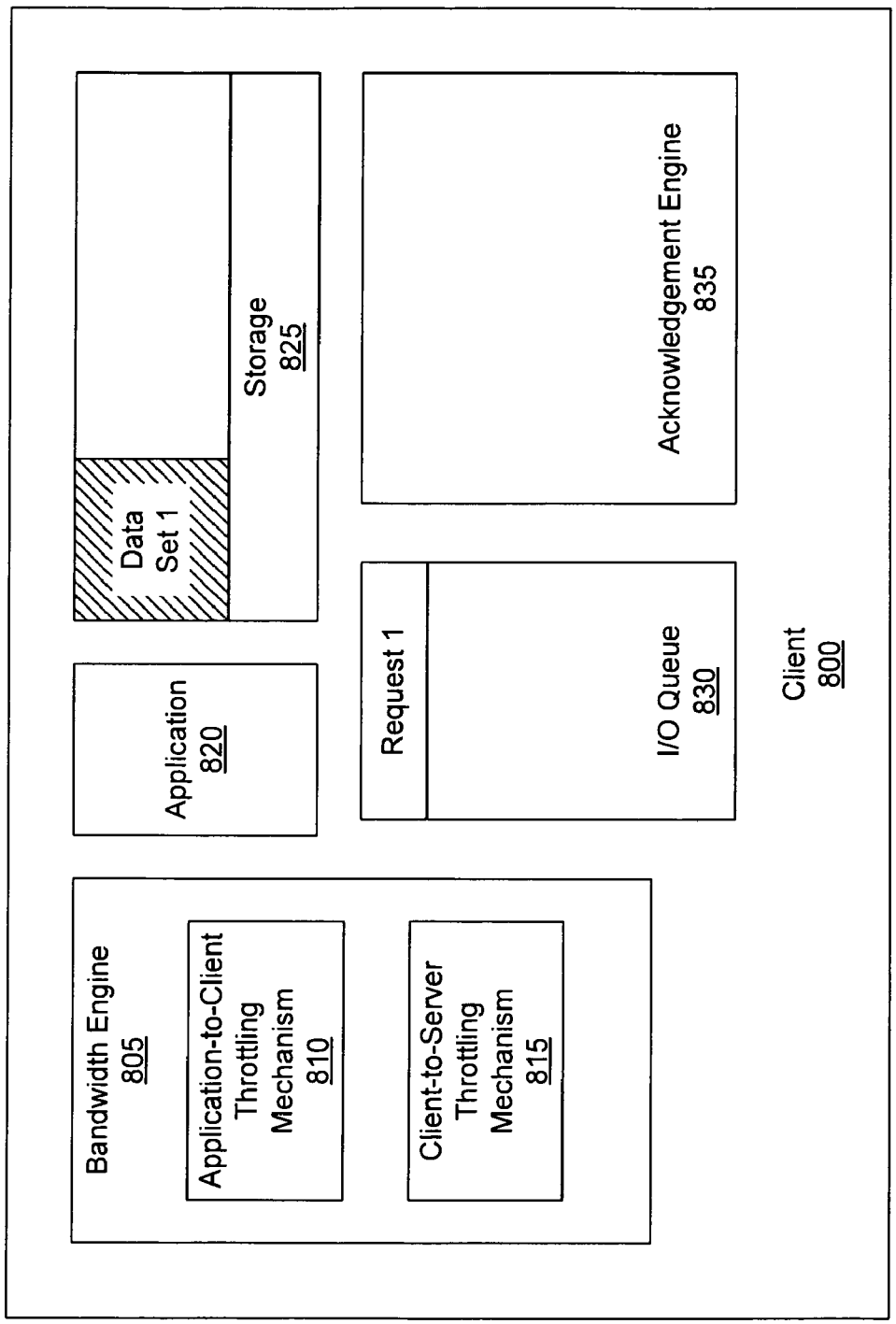
FIGS. 8A-8C show an example in accordance with one or more embodiments of the invention.
Figure 8B:
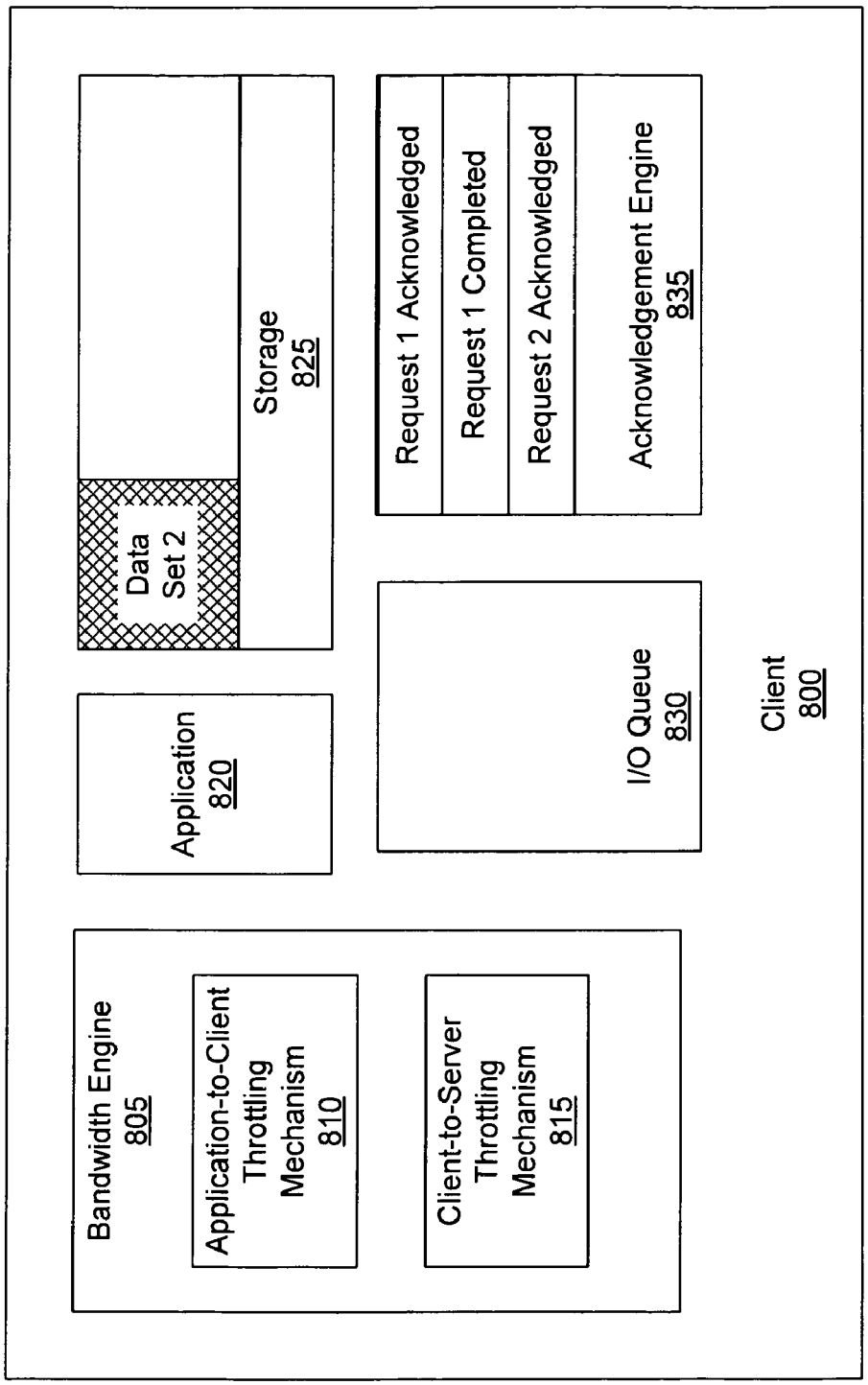
Figure 8C:
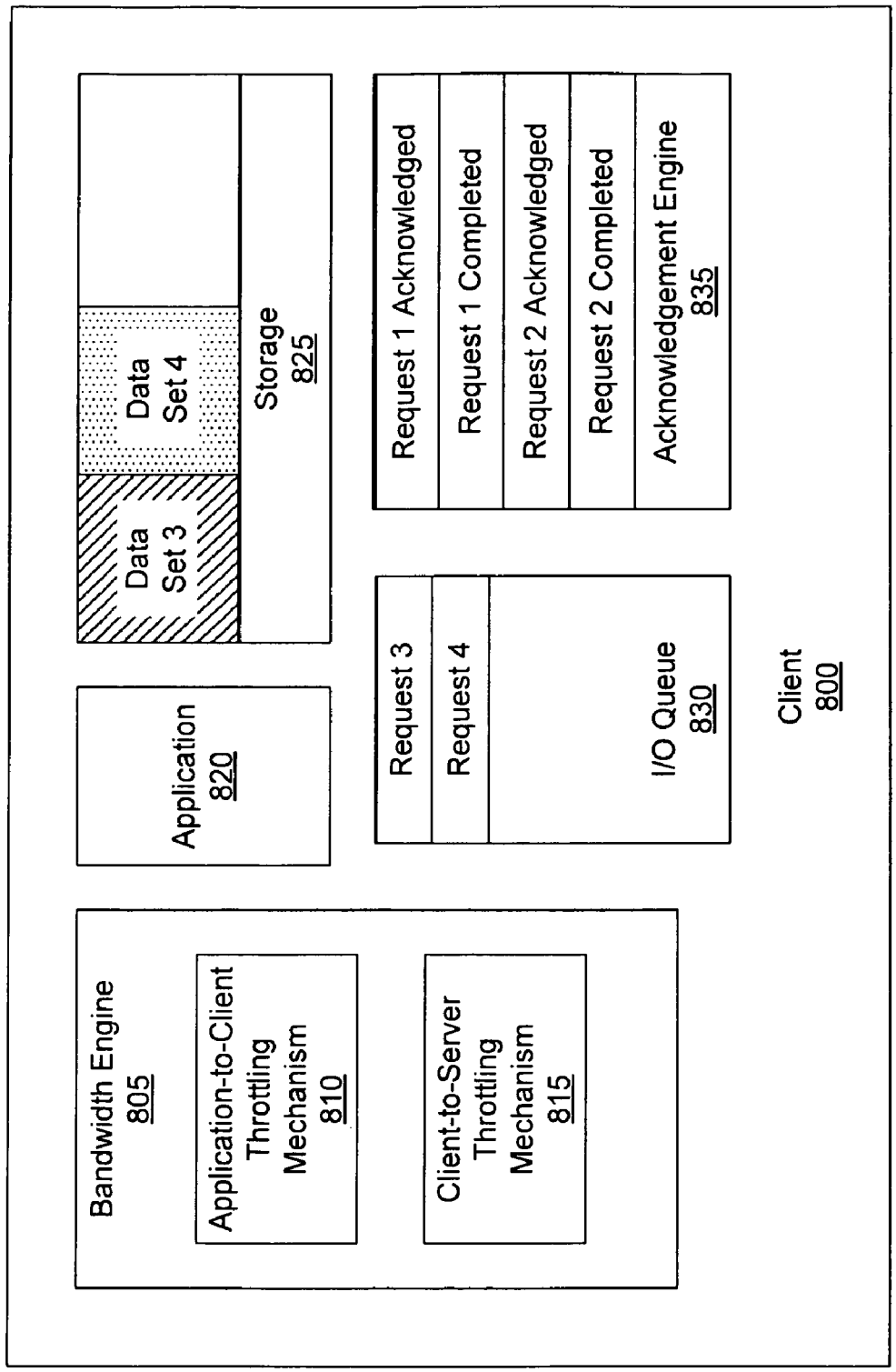

FIGS. 8A-8C show an example according to one or more embodiments of the invention. Specifically, FIGS. 8A-8C show a diagram of a client and how the application-to-client throttling mechanism and the client-to-server throttling mechanism impact the rate of data flow in the client over time.

FIG. 8A shows a snapshot of a client at a first time. According to one or more embodiments of the invention, the client (800) includes a bandwidth engine (805), and application (820), a storage device (825), and an I/O queue (830), all as described above. In FIGS. 8A-8C, the client (800) also includes an acknowledgment engine (835) used to receive acknowledgments from the server. According to one or more embodiments of the invention, the acknowledgment engine may be part of the bandwidth engine, but is shows separately here for clarification.

Referring to FIG. 8A, Data Set 1 has been generated by the application (820) and stored in client storage (825). A first request to write Data Set 1 to a server has been generated and is placed on the I/O queue (830).

FIG. 8B shows a snapshot of the client (800) at a second time. The application (820) has generated Data Set 2 to write to the server. The client storage (825) now holds Data Set 2, but Data Set 1 has been removed. The I/O Queue (830) does not hold any requests for the server. The acknowledgment engine shows that the request to write Data Set 1 has been acknowledged and completed. The request to write Data Set 2 has been acknowledged but not completed.

Between FIGS. 8A and 8B, the bandwidth engine will determine that the server is acknowledging and completing jobs to write data faster than the application (820) is generating data to write to the server. Accordingly, in Figure 8B, there is a large amount of available client storage and no I/O requests remaining on the queue.

FIG. 8C shows a snapshot of a client (800) at a third time. The application (820) has generated Data Set 3 and Data Set 4. The client storage (825) now holds Data Set 3 and Data Set 4. The I/O queue (830) holds a request to write the Data Set 3 and a request to write Data Set 4. The acknowledgment engine shows that the request to write Data Set 1 has been acknowledged and completed, and the request to write Data Set 2 has been acknowledged and completed.

The application-to-client throttling mechanism may modify the application bandwidth to optimize data moving between the client and the server, and the client-to-server throttling mechanism may modify the server bandwidth to reach an optimized bandwidth. FIG. 8C shows that the application-to-client throttling mechanism has increased the application bandwidth to generate data to write to the server more rapidly, as shown in FIG. 4. The client-to-server throttling mechanism has increased the bandwidth to optimize the server bandwidth, as shown in FIG. 5. According to one or more embodiments of the invention, the bandwidth engine will also determine a perceived bandwidth between the client and the server (as described in FIG. 6) and will dynamically reset the application bandwidth and the server bandwidth to the perceived bandwidth.

Figure 9:
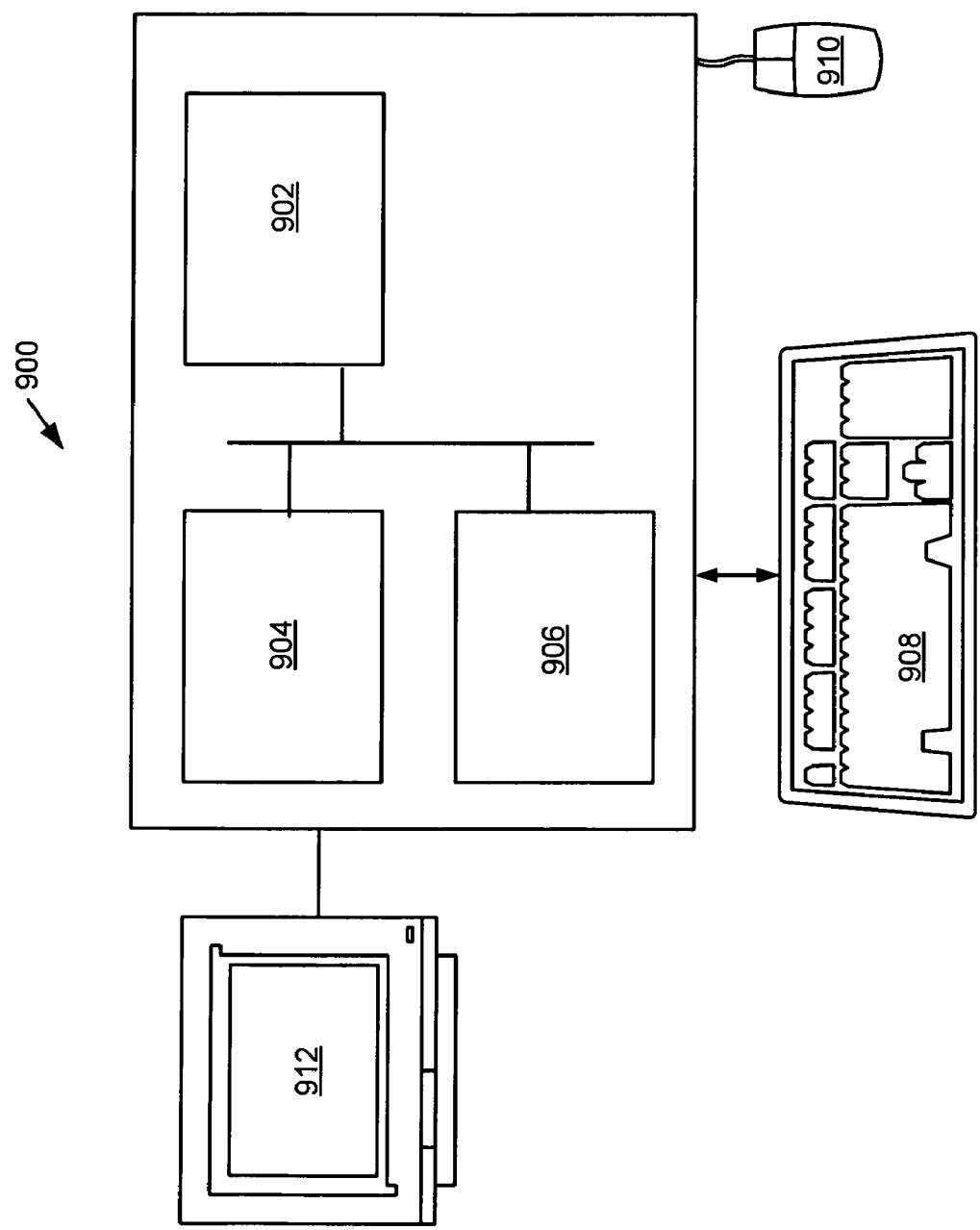
FIG. 9 shows a computer system in accordance with one or more embodiments of the invention.

Embodiments of the invention may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (900) includes at least the minimal processing, input, and/or output means necessary to practice embodiments of the invention.

Further, those skilled in the art will appreciate that one or more elements of the aforementioned computer system (900) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for throttling in a file system, comprising:
   receiving a first request by a client from an application to write first data to a server across a network, wherein the application is associated with an application bandwidth comprising a rate at which the application writes data to a client storage device;
   storing the first data in the client storage device using the application bandwidth;
   queuing a first I/O request to write the first data to the server on an I/O queue;
   issuing the first I/O request from the I/O queue to the server using a server bandwidth comprising a rate at which I/O requests to write data to the server are issued;
   receiving an acknowledgment that the first I/O request has been completed by the server;
   determining a first server acknowledgement rate using the acknowledgment that the first I/O request has been completed by the server;
   determining a first perceived bandwidth using the application bandwidth, the first server acknowledgement rate, and an amount of available space on the client storage device;
   resetting the server bandwidth to the perceived bandwidth to obtain a reset server bandwidth;
   receiving a second request by the client from the application to write second data to the server;
   storing the second data in the client storage device using the application bandwidth;
   queuing a second I/O request to write the second data to the server on the I/O queue; and
   issuing the second I/O request from the I/O queue to the server using the reset server bandwidth.

2. The method of claim 1, further comprising:
   receiving an acknowledgment that the second I/O request has been completed by the server;
   determining a second server acknowledgement rate using the acknowledgment that the second I/O request has been completed by the server;
   determining a second perceived bandwidth using the application bandwidth, the second server acknowledgement rate, and the amount of available space on the client storage device; and
   resetting the application bandwidth to the second perceived bandwidth.

3. A non-transitory computer readable storage medium for throttling in a file system, comprising computer readable code, wherein the code is configured to:
   receive a request, by a client from an application, to write first data to a server across a network, wherein the application is associated with an application bandwidth comprising a rate at which the application writes data to a client storage device;
   store the first data in the client storage device using the application bandwidth;
   queue a first I/O request to write the first data to the server on an I/O queue;
   issue the first I/O request from the I/O queue to the server using a server bandwidth comprising a rate at which I/O requests to write data to the server are issued;
   receive an acknowledgment that the first I/O request has been completed by the server;
   determine a first server acknowledgement rate using the acknowledgment that the first I/O request has been completed by the server;
   determine a first perceived bandwidth using the application bandwidth, the first server acknowledgement rate, and an amount of available space on the client storage device;
   reset the server bandwidth to the perceived bandwidth to obtain a reset server bandwidth;
   receive a second request by the client from the application to write second data to the server;
   store the second data in the client storage device using the application bandwidth;
   queue a second I/O request to write the second data to the server on the I/O queue; and
   issue the second I/O request from the I/O queue to the server using the reset server bandwidth.

4. The non-transitory computer readable storage medium of claim 3, wherein the code is further configured to:
   receive an acknowledgment that the second I/O request has been completed by the server;
   determine a second server acknowledgement rate using the acknowledgment that the second I/O request has been completed by the server;
   determine a second perceived bandwidth using the application bandwidth, the second server acknowledgement rate, and the amount of available space on the client storage device; and
   reset the application bandwidth to the second perceived bandwidth to obtain a reset application bandwidth.

5. The non-transitory computer readable storage medium of claim 4, wherein the code is further configured to, upon resetting the application bandwidth:
   receiving a request by the client from the application to write data to the server;
   storing the third data in the client storage device;
   queuing a third I/O request to write the third data to the server on the I/O queue using the reset application bandwidth; and
   issuing the third I/O request from the I/O queue to the server using the reset server bandwidth.

6. The non-transitory computer readable storage medium of claim 3, wherein the code is further configured to:
   make a first determination that a size of the first data is greater than the application bandwidth;
   make a second determination that the amount of available space on the client storage device is sufficient;
   make a third determination that the application bandwidth is greater than zero;
   allocate space in the client storage device to store the first data based on the first determination, the second determination, and the third determination; and
   write the first data to the allocated space in the client storage device.

7. The non-transitory computer readable storage medium of claim 3, wherein the code is further configured to:
   determine that a size of the first data is greater than the application bandwidth;
   determine that the amount of available space on the client storage device is insufficient; and
   write the first data to the client storage device when the application bandwidth is available.

8. The non-transitory computer readable storage medium of claim 3, wherein the code is further configured to:
   determine that a size of the first data is not greater than the application bandwidth;
   allocate space in the client storage device to store the first data; and
   write the first data to the allocated space in the client storage device when the application bandwidth is available.

9. The non-transitory computer readable storage medium of claim 3, wherein the code is further configured to:
   determine that a size of the first data is not greater than the server bandwidth; and
   decrement the server bandwidth.

10. The non-transitory computer readable storage medium of claim 3, wherein the code is further configured to:
   make a first determination that a size of the first data is greater than the server bandwidth;
   make a second determination that the amount of available space on the client storage device is insufficient;
   modify the first I/O request to write the first data synchronously based on the first determination and the second determination; and
   decrement the server bandwidth.

11. The non-transitory computer readable storage medium of claim 3, wherein the client is part of a client cluster.

12. A client, comprising:
   a processor;
   an application, executing on the processor, configured to send a request to the client to write first data to a server, wherein the application is associated with an application bandwidth and wherein the server is associated with a server bandwidth;
   a client storage device configured to store the first data using the application bandwidth comprising a rate at which the application writes data to a client storage device;
   an I/O queue configured to:
      queue a first I/O request to write the first data to the server; and
      issue the first I/O request to the server using a server bandwidth comprising a rate at which I/O requests to write data to the server are issued;
   an acknowledgement engine configured to receive an acknowledgment that the first I/O request has been completed by the server;
   a bandwidth engine configured to:
      determine a first server acknowledgement rate using the acknowledgment that the first I/O request has been completed by the servers;
      determine a first perceived bandwidth using the application bandwidth, the first server acknowledgement rate, and an amount of available space on the client storage device; and
      reset the server bandwidth to the perceived bandwidth to obtain a reset server bandwidth;
   wherein the application is further configured to send a second request to the client to write second data to the server;
   wherein the client storage device is further configured to store the second data using the application bandwidth; and
   wherein the I/O queue is further configured to:
      queue a second I/O request to write the second data to the server; and
      issue the second I/O request to the server using the reset server bandwidth.

13. The client of claim 12, wherein the bandwidth engine is further configured to:
   receive an acknowledgment that the second I/O request has been completed by the server;
   determine a second server acknowledgement rate using the acknowledgment that the second I/O request has been completed by the server;
   determine a second perceived bandwidth using the application bandwidth, the second server acknowledgement rate, and the amount of available space on the client storage device; and
   resetting the application bandwidth to the second perceived bandwidth to obtain a reset application bandwidth.

14. The client of claim 13,
   wherein the bandwidth engine is further configured to, upon resetting the application bandwidth:
      receive a request from the application to write third data to the server;
      store the third data in the client storage device; and
      queue a third I/O request to write the third data to the server on the I/O queue using the reset application bandwidth; and
   wherein the I/O queue is further configured to issue the third I/O request to the server using the reset server bandwidth.

15. The client of claim 12, wherein the bandwidth engine comprises an application-to-client throttling mechanism configured to:
   determine that the amount of available space on the client storage device is sufficient;
   determine that the application bandwidth is greater than zero;
   allocate space in the client storage device to store the first data; and
   write the first data to the allocated space in the client storage device.

16. The client of claim 12, wherein the bandwidth engine comprises an application-to-client throttling mechanism configured to:
   determine that a size of the first data is greater than the application bandwidth;
   determine that the amount of available space on the client storage device is insufficient; and
   write the first data to the client storage device when the application bandwidth is available.

17. The client of claim 12, wherein the bandwidth engine comprises an application-to-client throttling mechanism configured to:
   determine that a size of the first data is not greater than the application bandwidth;
   allocate space in the client storage device to store the first data; and
   write the first data to the allocated space in the client storage device when the application bandwidth is available.

18. The client of claim 12, wherein the bandwidth engine comprises a client-to-server throttling mechanism configured to:
   determine that a size of the first data is not greater than the server bandwidth; and
   decrement the server bandwidth.

19. The client of claim 12, wherein the bandwidth engine comprises a client-to-server throttling mechanism configured to:
   determine that a size of the first data is greater than the server bandwidth;
   determine that the amount of available space on the client storage device is insufficient;
   modify the first I/O request to write the first data synchronously; and
   decrement the server bandwidth.

20. The client of claim 12, wherein the client is part of a client cluster.

* * * * *